(12) United States Patent
Kent

(10) Patent No.: US 7,646,621 B2
(45) Date of Patent: Jan. 12, 2010

(54) PROGRAMMABLE POWER SUPPLY

(75) Inventor: Thomas Alan Kent, Webb City, MO (US)

(73) Assignee: Acceler Optics, LLC, Carthage, MO (US)

( * ) Notice: Subject to any disclaimer, the term of this patent is extended or adjusted under 35 U.S.C. 154(b) by 399 days.

(21) Appl. No.: 11/298,054

(22) Filed: Dec. 9, 2005

(65) Prior Publication Data

US 2007/0132665 A1 Jun. 14, 2007

(51) Int. Cl.
*H02M 1/00* (2007.01)
*G09G 3/12* (2006.01)
*G09G 5/00* (2006.01)

(52) U.S. Cl. .................. 363/147; 345/45; 345/204; 345/2.1

(58) Field of Classification Search .......... 340/907, 340/539, 13; 345/45, 2.1, 76, 204, 903; 363/16, 363/17, 147
See application file for complete search history.

(56) References Cited

U.S. PATENT DOCUMENTS

| 5,485,145 | A  | * | 1/1996  | Sniff ..................... 340/815.4 |
| 5,680,192 | A  | * | 10/1997 | Burrell et al. ............ 349/152 |
| 6,771,256 | B1 | * | 8/2004  | Abraham et al. .......... 345/204 |
| 7,098,807 | B2 | * | 8/2006  | Seguin et al. ............ 340/907 |
| 2003/0095043 | A1 | * | 5/2003 | Butzer et al. ........ 340/539.13 |
| 2006/0038702 | A1 | * | 2/2006 | Lo ....................... 340/907 |

\* cited by examiner

*Primary Examiner*—Edward Tso
*Assistant Examiner*—M'Baye Diao
(74) *Attorney, Agent, or Firm*—Martin & Associates,LLC; Derek P. Martin (57) ABSTRACT

A programmable power supply provides multiple output channels that may be independently driven to vary the frequency and duty cycle of each channel. The power supply includes the capability of receiving a program via a program interface on the power supply. The power supply also includes the capability of reading a program from a device that is plugged into the power supply's output connector. In this manner, a device to be powered (such as an EL panel sign with multiple segments) may contain a program that specifies how the segments are to be driven. This allows the power supply to dynamically reconfigure itself for many different signs by simply plugging a different sign into its output connector. The preferred embodiments also provide an improved connector system for EL panel signs, and includes output compensation to automatically compensate for degradation in an EL panel over time.

30 Claims, 7 Drawing Sheets

Hard On    Hard Off
Fade On    Fade Off
Brightness

PROGRAMMABLE POWER SUPPLY

BACKGROUND OF THE INVENTION

1. Technical Field

This invention generally relates to power supplies, and more specifically relates to programmable power supplies for driving multiple loads.

2. Background Art

Power supplies come in a variety of different shapes, sizes, and functional capabilities. One type of power supply that is well-known is the programmable power supply that provides multiple output channels that may be programmed to drive multiple loads. For example, bench power supplies for use by technicians often have the capability of setting a particular output to a wide range of voltage and current capability, and may allow for both direct current (DC) and alternating current (AC) outputs. These highly programmable bench power supplies are very expensive, some costing thousands of dollars. On the other end of the spectrum are small, dedicated power supplies that are manufactured to power a known load at a specified voltage and current. These types of power supplies are typically very inexpensive, but are suitable only for their specific, designed use.

Sign controllers are also known in the art that provide power to different circuits in a defined sequence to provide an animated sign. For example, a sign with an arrow made of light bulbs may divide the arrow into four different circuits, then use a sign controller that sequences the four circuits in a manner that makes the arrow appear to grow larger until the entire arrow is lit. Sequenced controllers are well-known in the art for controlling signs. Known sequenced controllers include motors with mechanical contactors, and solid-state controllers that use relays or triacs to drive the loads under control of a state machine or microprocessor.

A relatively recent development in the sign industry is to make a sign from an electroluminescent (EL) panel that has multiple segments that may be individually driven. In addition, recent developments have used printed polymer inks, or other phosphorescent materials, such as organic light-emitting diodes (OLEDs). With any of these technologies that allow defining multiple segments, the different segments typically are overlaid with artwork. By individually driving the segments under control of a state machine or microprocessor, the sign may be animated. There are two significant problems with the prior art methods of powering a multiple-segment EL panel sign. The first problem relates to the electrical connections to the sign itself. The current state of the art uses pigtail wire connections on the back of the sign that are connected to a connector. These pigtail wire connections are a point of common failure. The second problem relates to the design of the power supply for a particular sign. Currently, power supplies for powering an EL panel sign are custom-designed for the particular sign. Thus, if a sign with six segments needs to be powered, a power supply with six output channels is provided with the desired sequence of animating the sign being hard-coded into the power supply. The problem with this approach is that EL panels degrade over time, and eventually wear out. When the EL panel wears out, the EL panel and the power supply are typically thrown away. Because the power supply is unique to the particular sign, the power supply is not reusable for different types of signs. Without a way to provide a programmable power supply that may be reused with a variety of different signs, the sign industry will continue to suffer excessive costs by discarding power supplies that are specifically designed to work only for a particular sign.

DISCLOSURE OF INVENTION

According to the preferred embodiments, a programmable power supply provides multiple output channels that may be independently driven to vary the frequency and duty cycle of each channel. The power supply includes the capability of receiving a program via a program interface, such as a serial port or wireless interface on the power supply. The power supply also includes the capability of reading an output program from a device that is plugged into the power supply's output connector. In this manner, a device to be powered (such as an EL panel sign with multiple segments) may contain a program that specifies how the segments are to be driven. When the power supply powers up, it checks to see if it has a program currently loaded in its memory. The power supply also checks to see if a device with a program is plugged into its output connector. If the power supply has an output program already loaded in its memory, and if the device plugged into the output connector has a program, the two are compared. If they match, the power supply already has the program loaded, and can proceed to run the program. If they do not match, the power supply downloads the program from the device plugged into the output connector, then runs the downloaded program. In this manner, the power supply may dynamically reconfigure itself for many different signs by simply plugging a different sign into its output connector. The preferred embodiments also provide an improved connector system for EL panel signs that avoid the pigtail connections in the prior art. In addition, the power supply includes output compensation to automatically compensate for degradation in an EL panel over time. The power supply may also include multiple slave modules to increase the number of channels that may be driven. In addition, the power supply includes an I/O interface that allows receiving control inputs from sensors to provide a desired sequence when a control input is detected, and also allows outputting control signals to drive any suitable equipment, including speakers, multimedia devices, etc.

The foregoing and other features and advantages of the invention will be apparent from the following more particular description of preferred embodiments of the invention, as illustrated in the accompanying drawings.

BRIEF DESCRIPTION OF DRAWINGS

The preferred embodiments of the present invention will hereinafter be described in conjunction with the appended drawings, where like designations denote like elements, and.

BEST MODE FOR CARRYING OUT THE INVENTION

The preferred embodiments provide a multi-channel programmable power supply that is reusable for many different applications. The programmable power supply of the preferred embodiments is especially well-suited to driving signs with multiple segments that may be individually illuminated using any suitable technology, including EL panels, OLEDs, carbon nanotubes, phosphorescent ink, etc. A sign may include a program that may be downloaded to the power supply to instruct the power supply how to drive its outputs to accommodate the sign. In the alternative, the power supply may be programmed via a direct wire connection, such as a serial port, or via a wireless interface. By providing a power supply that can dynamically load a program from a sign, the power supply becomes universal and capable of driving almost any multi-segment sign simply by plugging the sign into the power supply output connector.

Figure 1:
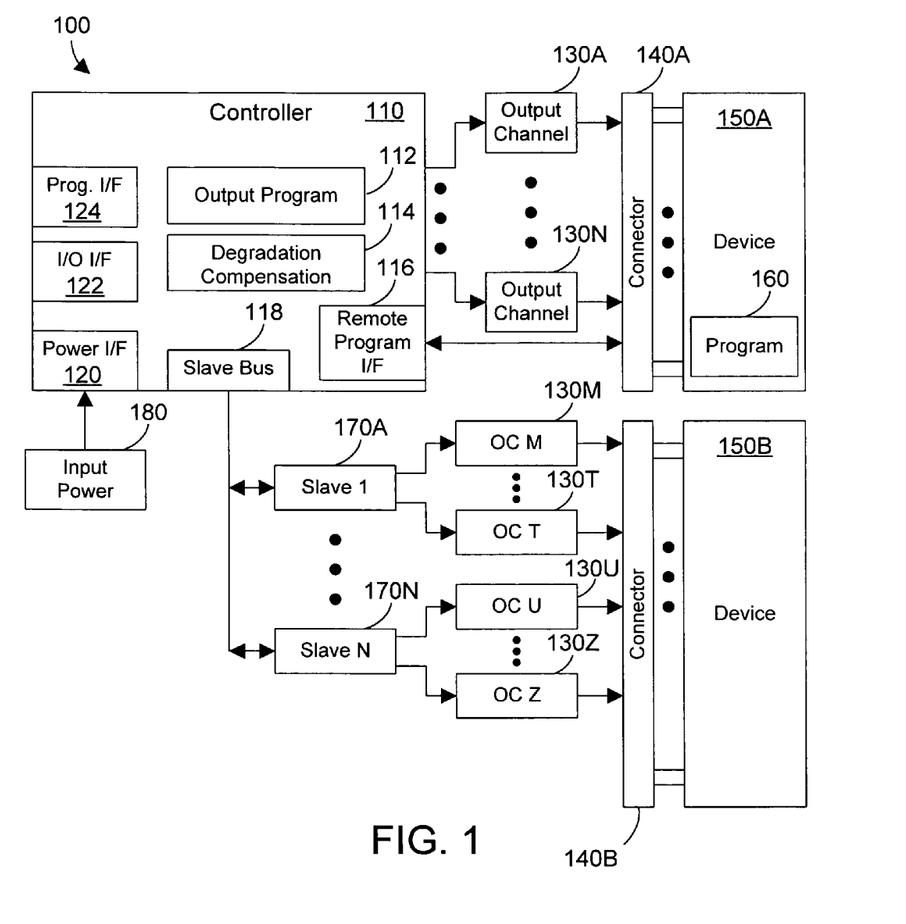
FIG. 1 is a block diagram of a programmable power supply in accordance with the preferred embodiments.

Referring to FIG. 1, a programmable power supply 100 in accordance with the preferred embodiments includes a controller 110 coupled to a plurality of output channels 130A, ..., 130N, which are coupled to an output connector 140A. A device to be powered 150A is plugged into the connector 140A. The device to be powered 150A preferably includes a program 160 that specifies how the multiple circuits in the device 150A are to be driven. The controller 110 includes a remote program interface 116 that allows downloading the program 160 from the device 150A. The program 160 may be downloaded into controller 110 and may become or may be used to generate the output program 112. The output channels 130A, ..., 130N are driven by the controller 110 according to the output program 112.

The controller 110 also includes a programming interface 124 that allows the output program 112 to be received from an external program source. The programming interface 124 may comprise a hardwire interface, such as a serial port, or may include any suitable wireless interface. Examples of suitable protocols for programming interface 124 includes RS232, I²C, CAN, USB, Bluetooth, and Profibus. The programming interface 124 allows downloading an output program 112 to the controller 110 if the device coupled to the output connector 140A does not include a program, or if the program for the device needs to be changed. If a device is used that has no program on board, the output program 112 may be loaded via the programming interface 124 using any suitable mechanism, such as a notebook computer or personal digital assistant (PDA). If a device is used that has a program on board, but a different program for the device is preferred, a new program can be loaded as the output program from the programming interface 124. We see from these examples that the output program may be derived from the program 160 in the device, or from information downloaded from any suitable external program source.

The controller 110 also includes degradation compensation 114. The degradation compensation 114 automatically monitors the time the device 150A is in service, and automatically changes the characteristics of the electrical signal applied to one or more output channels to compensate for any time-related degradation in performance. For example, EL panels dim over time. The rate at which an EL panel dims (or degrades in performance) is a known function of the time the EL panel is illuminated. The degradation compensation 114 may be performed in one of two different ways, referred to herein as statistic-based compensation and performance-based compensation. In statistic-based compensation, a graph or table represents the expected degradation in performance for an EL segment based on the time the EL segment is illuminated. The controller 110 monitors the time each segment is illuminated, and based on the stored graph or table, dynamically changes the output to compensate for the expected degradation in performance. In performance-based compensation, one or more operational characteristics of the EL panel are dynamically monitored, and the output may be dynamically changed to compensate for the actual degradation in performance that is determined by the monitored characteristics. For example, the voltage and current to the EL segment could be monitored by the controller 110. In addition, the brightness of the EL segment could be directly measured using a suitable light-sensitive device, such as a light-sensitive resistor or transistor, and when a decrease in brightness is detected, the characteristics of the output channel driving the EL segment may be adjusted to compensate for the decrease in brightness. The advantage of the performance-based compensation is that the sensors allow closed-loop control, which means that the characteristics of the output channel driving the EL segment may be adjusted, and the effect of the adjustment may then be determined from the monitored characteristics of the EL panel.

The controller 110 also includes a power interface 120 that receives power from any suitable source of input power 180. For example, input power 180 may be line power, for example at 110 VAC or 220 VAC, or may be DC power supplied for example by a DC power supply or a battery. In one specific implementation of the preferred embodiments, the sign may optionally include a solar panel that recharges a rechargeable battery that serves as input power 180. The input power 180 in FIG. 1 extends to any an all suitable ways to power the controller 110, whether currently known or developed in the future.

The controller 110 also includes a slave bus 118 that allows for expanding the capabilities of the power supply 100. Note that slave bus 118 preferably includes a power bus that provides power to the slaves. The slave bus 118 may be plugged into one or more slaves, shown in FIG. 1 as 170A, ..., 170N. Each slave drives a corresponding set of output channels. For the example in FIG. 1, slave 170A drives output channels 130M, 130T, and slave 170N drives output channels 130U, ..., 130Z. The outputs of the output channels on the slaves may be coupled to the main output connector 140A, or may be coupled to a secondary output connector 140B as shown in FIG. 1. The slaves extend the capability of the controller 110 to any suitable number of channels. For example, in the most preferred implementation, the controller 110 directly drives eight output channels, and each slave module drives an additional eight output channels, with a total of 1,024 output channels being controlled by a single controller 110 through its slave modules.

The output connector 140A provides a novel way of attaching an EL panel sign to a power supply. As discussed above, the current state-of-the-art for EL panel signs uses wire pigtail connections on the back side of the panel, which are connected to some connector that mates with a connector on the dedicated power supply to which the EL panel will be connected. These pigtail connections are a point of common failure. The preferred embodiments gets rid of the pigtail connections by providing a connector on the EL panel that resembles a card-edge connector. Card-edge connectors are commonly used on small circuit boards that are placed into slots on a motherboard in a desktop computer system. The conductors may be placed on an edge of the sign, or on a small board protruding from the sign. By providing a connector into which a part of the sign is placed to make connection with the conductors, a reliable connection is achieved. In the case of EL panels, the manufacturing process for an EL panel that has multiple segments defined typically includes a process for defining conductors to the individual segments. In the preferred embodiments, these conductors are routed to the edge of the panel to form a pattern of conductors that may be placed into the output connector 140A. In the alternative, a small board may be integrated perpendicular to the EL panel that includes exposed conductors that mate with a card-edge connector. Thus, a connection is made between an EL panel and the power supply by simply plugging the edge of the EL panel or other portion of the EL panel into the output connector 140A. In this manner, the prior art failures caused by broken pigtail connections are avoided.

Figure 2:
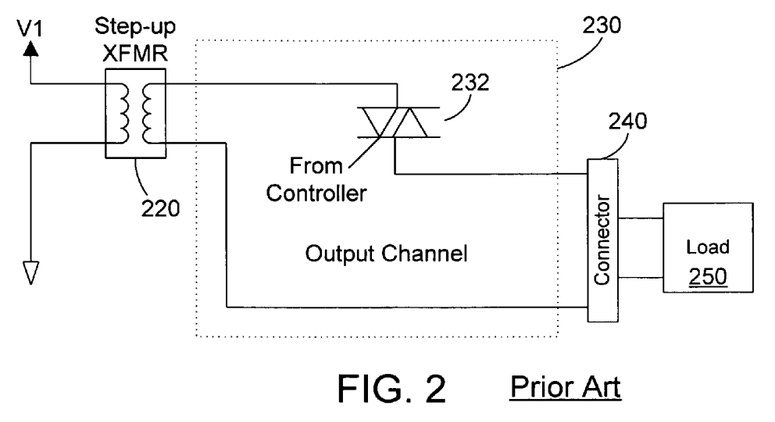
FIG. 2 is a block diagram of a prior art output channel for a known dedicated power supply for a multi-segment EL panel sign.

The configuration of the output channels 130 of the preferred embodiments is a significant improvement over the prior art. Referring to FIG. 2, a prior art output channel 230 in a power supply that is dedicated to a particular EL sign with multiple segments is shown. Alternating current flows through the primary winding of the step-up transformer 220 from an alternating current (AC) voltage source, shown in FIG. 2 as VAC. The resulting AC input to the transformer primary results in an alternating current at a higher voltage at the secondary output of the transformer 220. The controller drives a gate of a triac 232 that controls application of power from the secondary winding of the transformer 220 to the load 250 through the connector 240. One suitable example of load 250 is an EL segment. In the prior art output channel as shown in FIG. 2, the signal from the controller to the triac 232 is driven to turn on the triac 232 when the channel needs to be turned on, and is driven to turn off the triac 232 when the channel needs to be turned off. In addition, all channels are driven by the same transformer 220. The result is that all prior art channels are driven at the same frequency and duty cycle, which is determined by the alternating current voltage supply VAC.

Figure 3:
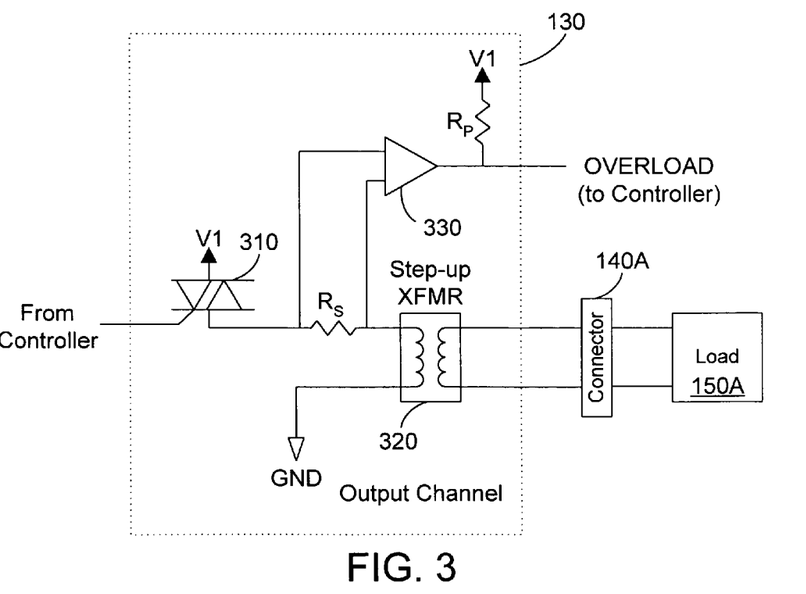
FIG. 3 is a block diagram of an output channel in accordance with the preferred embodiments.

Referring to FIG. 3, the output channel 130 of the preferred embodiments places a step-up transformer 320 in each output channel, with the power applied to the primary winding of the transformer 320 via a triac 310 that is controlled by an output of the controller. The secondary coil may then be directly coupled to the output connector 140A, which is coupled to the load 150A. The output channel 130 can also optionally include an overload detector. One suitable implementation of an overload protector is shown in FIG. 3 to include a sense resistor $R_S$ that drives a comparator 330 that has an output in a high logic state due to the pullup resistor $R_P$ when there is no overload condition. When voltage across the sense resistor $R_S$ exceeds a predetermined threshold, the output of the comparator 330 is driven low to indicate an overload condition in the output channel 130. The overload signal is output to the controller. When the controller receives the overload signal, the controller stops driving the triac 310, thereby shutting down the output channel 130 before damage to components occurs due to the overload. An alternative way to provide overload protection in the channel is to provide a third winding in the output channel 320 that drives a comparator to indicate an overload when the magnetic field in the transformer 320 collapses due to an overload condition.

The differences between the output channel 230 of the prior art shown in FIG. 2 and the output channel 130 of the preferred embodiments shown in FIG. 3 are significant. At first blush, it might appear that putting a transformer in each output channel might unduly increase the cost of the power supply. However, the increased cost of multiple transformers is offset by the reduced cost of the triac. In the prior art, the triac 232 switches the secondary side of the transformer, which is typically at 150-200 VAC. A triac with this high voltage capability typically has a high current capability as well, and is relatively expensive. EL panels typically draw very low current, typically measured in milliamps, so the high-power capability of the prior art triacs 232 goes largely wasted, but they are required to switch the relatively high voltage. In the preferred embodiments, in contrast, the triac 310 switches the primary side of the transformer, which is typically around 20 VAC. As a result, a much smaller and less expensive triac may be used in the preferred embodiments, thereby offsetting some or all of the additional cost imposed by using a transformer in each channel.

One of the features of the prior art output channels 230 in FIG. 2 is an audible buzz that results from switching the triac 232 at high voltage and from the transformer 220. By switching the primary side of the transformer 320 of the preferred embodiments, and by appropriate designing the transformer to have a powdered iron core instead of a laminated core, almost all of the audible buzz is eliminated, resulting in a very quiet power supply when compared to the prior art.

The primary advantage to placing a transformer 320 in each output channel 130 is the individual control of both frequency and duty cycle that may be attained. Thus, one segment may be driven with a relatively high duty cycle to achieve a brightly-lit segment, while a different segment may be driven with a relatively low duty cycle to achieve a more dimly-lit segment. In addition, the frequency of the signals may be individually selected and varied as required. This level of control is not available in known controllers or power supplies.

Figure 4:
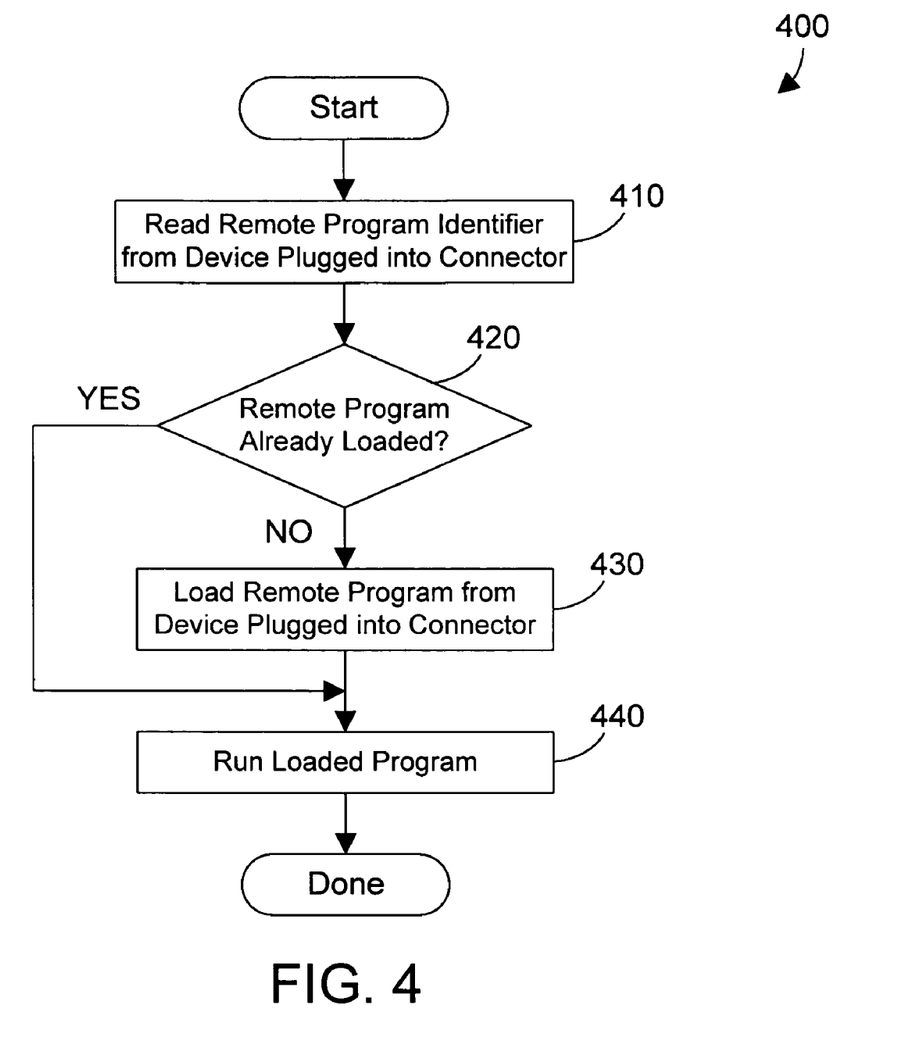
FIG. 4 is a method for the controller in FIG. 1 to run a loaded output program in accordance with the preferred embodiments.

Referring now to FIG. 4, a method 400 in accordance with the preferred embodiments shows the steps a controller 100 in FIG. 1 might take when initially powering up. A remote program identifier is read from the device plugged into the output connector (step 410). If there is no program present, the lack of the program will be detected in step 410. The controller then compares the remote program identifier with an identifier for a program 112 loaded in its memory, if present. If the remote program has already been loaded (step 420=YES), it need not be loaded again. The loaded program may be run (step 440), at which point the power supply provides the desired animation sequence to the multiple circuits on the device. If there is no program loaded in the memory, or if the remote program identifier does not match the program loaded in the memory (step 420=NO), the remote program is loaded from the device (step 430). In this manner the power supply can automatically switch function when a new sign is plugged into its output connector, by downloading the program from the sign and activating the output channels according to the downloaded program.

In a variation of method 400 shown in FIG. 4, the controller could determine which program to run based on a date code that is included as part of the program identifier. Thus, let's assume a device plugged into the power supply includes a program that has a program identifier that includes a date code. Using method 400 in FIG. 4, the controller 100 will read the program from the device, and run the program. Now let's assume there is an update to the program that is loaded via a portable device into the memory of the controller 100. The controller 100 could detect that the device includes a program, and that its own memory includes a program, then run the program that has the later date code. In this manner, the controller 100 can suitably select to run a program in its memory instead of running the program on the device based on the more recent date code for the program in its memory.

Note that the term "program" is used in a broad sense to indicate any suitable information that tells the controller 100 how to drive its output channels 130. In the most preferred implementation, the controller 100 is a microcontroller, and the program 160 in the device 150A is executable code for the microcontroller. For example, in one specific implementation in accordance with the preferred embodiments, a DS89C390 microcontroller from Dallas Semiconductor may be used as the controller 100. When a microcontroller is used, the program may be downloaded and directly executed by the microcontroller, without the microcontroller having any knowledge of the configuration of the sign other than the program it executes. In an alternative embodiment, the program is a specification of how and when segments in the sign should be turned on and off. In this case, the microcontroller could read this information to generate appropriate outputs on the output channels without directly executing the program. For example, a new "language" could be developed that provides a uniform way for describing the behavior of sign segments. The program could then be written in this language, and interpreted by the controller to determine how to drive its output channels. The preferred embodiments expressly extend to any definition of a program that provides the ability to download the program from a device plugged into the power supply's output connector that tells the power supply how to drive the device.

One way to provide a new "language" for controller 100 is to provide a program that controller 100 executes that is essentially an executable state machine. The information of how the state machine should move between its states is programmable, and is received from external information. As a result, the controller 100 includes an infrastructure or framework of code that it executes, with the specific behavior of the framework determined by information external to the program. This allows the running program to be altered on the fly by dynamically changing the state information as the program is executed by the controller 100. In this configuration, the program that controller 100 executes does not change, only the variables that determine how the program executes are changed to provide the desired behavior for controller 100.

Note that providing the program on the device is preferable to providing the program in the controller's memory, with some identifier on the device that specifies which program in the memory to access. The primary difference deals with compatibility as the number of programs grows. If all of the programs are stored in the controller's memory, the power supply is only useful for signs that may use one of the stored programs. If a new sign is developed, the power supply is useless to drive the new sign until the memory can be upgraded to include the new program. With the downloaded program of the preferred embodiments, however, the program resides on the sign itself. This means that a brand new sign will include a brand new program that the controller may download and use without the need of storing a large number of different programs on the controller. Note also that the controller 100 could include multiple programs, with the selection of the appropriate program being done by the controller reading date codes of the programs, or by the controller receiving information regarding which program to run from any suitable source, including via the program interface and via the remote program interface.

Figure 5:
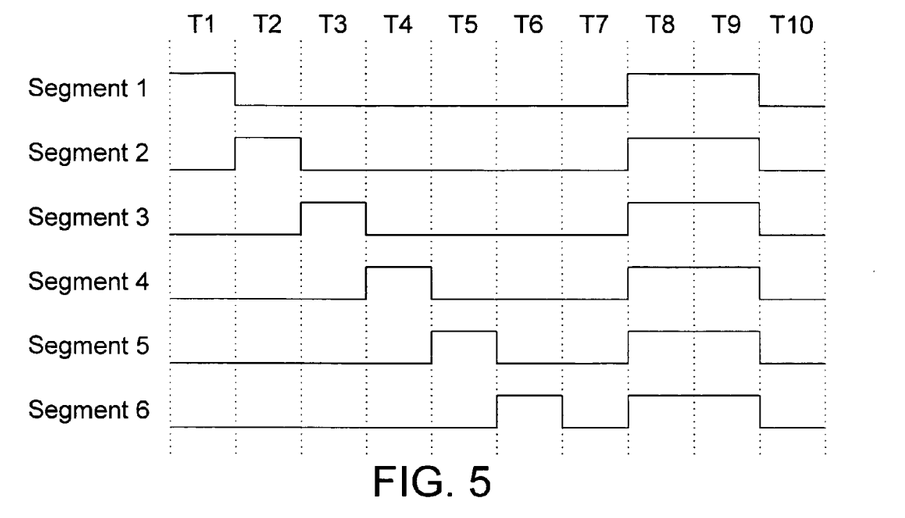
FIG. 5 is a timing diagram showing a sample sequence for driving a six segment EL panel sign.

FIG. 5 shows a sample timing diagram for an EL panel sign that has six different segments. The timing diagram of FIG. 5 is one suitable example of a "program" for this particular six segment sign. There are 10 defined time slices labeled T1-T10 in FIG. 5. During time slice T1, segment 1 is turned on, while all of the other segments are turned off. During time slice T2, segment 2 is turned on, while all of the other segments are turned off. During time slice T3, segment 3 is turned on, while all of the other segments are turned off. During time slice T4, segment 4 is turned on, while all of the other segments are turned off. During time slice T5, segment 5 is turned on, while all of the other segments are turned off. During time slice T6, segment 6 is turned on, while all of the other segments are turned off. During time slice T7, all segments 1-6 are turned off. During time slices T8 and T9, all segments 1-6 are turned on. During time slice T10, all segments 1-6 are turned off. We assume that this sequence goes back to T1 after T10 has been executed, thereby repeating the sequence again and again.

In the prior art, a power supply would be hard-coded with the sequence in FIG. 5 to drive the corresponding six-segment sign. Once the sign fails or needs to be updated or replaced, the power supply would typically be thrown away, because it is only useful to drive this one type of sign. The preferred embodiments extend the useful life of a power supply by dynamically reprogramming the power supply according to the device plugged into its output connector. As discussed above, the program may reside on the device itself, or may come from an external program source.

Let's assume that a sign includes the graphic DRINK COKE, and is placed on Coke vending machines. Let's further assume that each letter in the word DRINK is a separate segment, and the work COKE is also a separate segment. The segments corresponding to the letters in the word DRINK are connected to segments 1-5, respectively, and the segment corresponding to the word COKE is connected to segment 6. With this configuration, the D will illuminate at T1, the R will illuminate at T2, the I will illuminate at T3, the N will illuminate at T4, the K will illuminate at T5, the COKE would illuminate at T6, all segments would turn off during T7, then all segments are turned on during T8 and T9 resulting in illuminating all of the segments to read DRINK COKE. All segments are turned off during T11, and the sequence then repeats.

In one particular implementation, the sign itself contains the program that produces the action shown in FIG. 5, as shown at 160 in FIG. 1. In the alternative, the program could be loaded from an external program source, such as a notebook computer, PDA, wireless handheld device, or other suitable device that could download the program to the controller in the power supply.

Let's assume for the sake of example that the sign does not contain the program. When the sign is installed into the output connector of the power supply, the controller determines that no program is present. Let's also assume that a vending machine service person has a handheld device that plugs into a serial port on the power supply that serves as the programming interface 124 in FIG. 1, or that communicates via wireless interface with the programming interface 124. The service person can install the sign, then download the program for the sign from the handheld device. If the animation sequence for the same sign needs to change, the service person can download a new program that provides a different animation sequence. If a new sign is installed, the service person can download a new program corresponding to the new sign.

Now let's assume in another example that the sign contains the program. As explained above with reference to FIG. 4, the controller will download the program from the sign and run the program. Now let's assume that the animation sequence needs to change. The service person could download a different program that provides a different animation sequence via the handheld device. The handheld device could also instruct the controller to run the program that was downloaded, and not download the program from the sign. In this manner, the animation sequence for a sign could be changed to be a different sequence than stored on the on-board program on the sign. When the service person replaces the sign with a new sign that contains an on-board program, the controller downloads the program and runs the program to provide an animation sequence specified in the new sign's on-board program.

Figure 6:
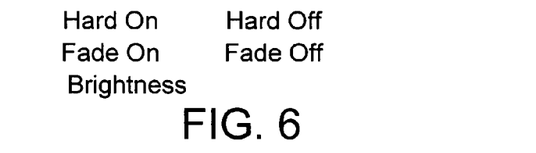
FIG. 6 shows some of the options for driving an EL panel segment using the programmable power supply of the preferred embodiments.

Many sign controllers drive light bulbs with triacs or other switching devices that turn the bulbs on and off. When EL panels are used, the segments may be turned hard on and hard off, but the presentation may also be altered by providing a suitable output frequency and duty cycle on the output channels. Different effects may be achieved, as shown in FIG. 6. Because EL panels are capacitive in nature, varying the frequency and duty cycle gives indirect control over the voltage across the segment according to the RC time constant for the segment. Varying the frequency and/or duty cycle thus allows fading a segment on and fading a segment off. In addition, varying the frequency and/or duty cycle allows direct control of the brightness of a segment. Thus, a segment could be turned hard on, but at a reduced brightness. A segment could be faded on to a desired level of brightness, then faded off. The capacitive nature of an EL panel and the ability to individually program frequency and duty cycle of each output channel allows achieving a far greater range of effects on a sign than is possible using prior art sign controllers.

Figure 7:
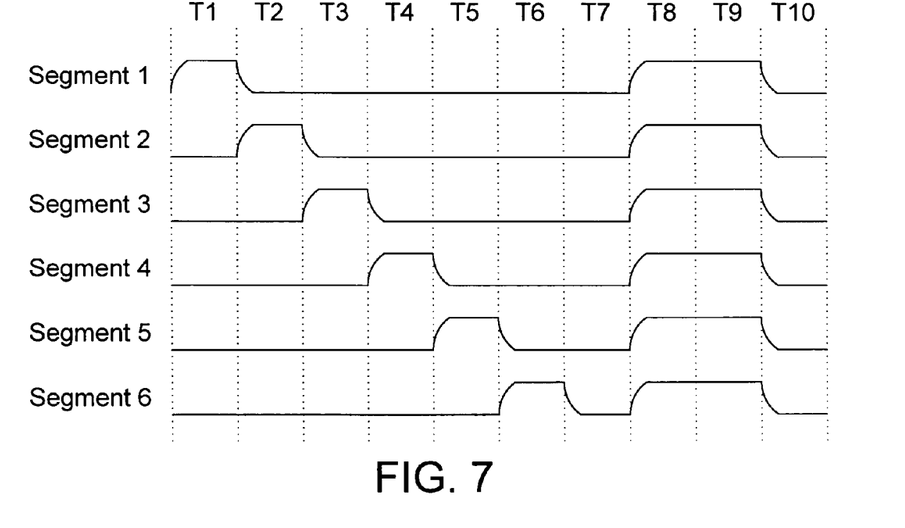
FIG. 7 is another timing diagram showing the same sample sequence for driving a six segment EL panel sign as shown in FIG. 5, but with the segments fading on and off instead of turning hard on and hard off.

We now assume that the program represented by the timing diagram in FIG. 6 is modified to fade in and fade out each time a segment is turned on and off, respectively. The hard edges in FIG. 5 are replaced by sloping edges that provide desired fade on and fade off characteristics, as shown in FIG. 7. The ability to independently program each output channel for a desired frequency and duty cycle allows fading and brightness control that is not available using prior art sign controllers.

Figure 8:
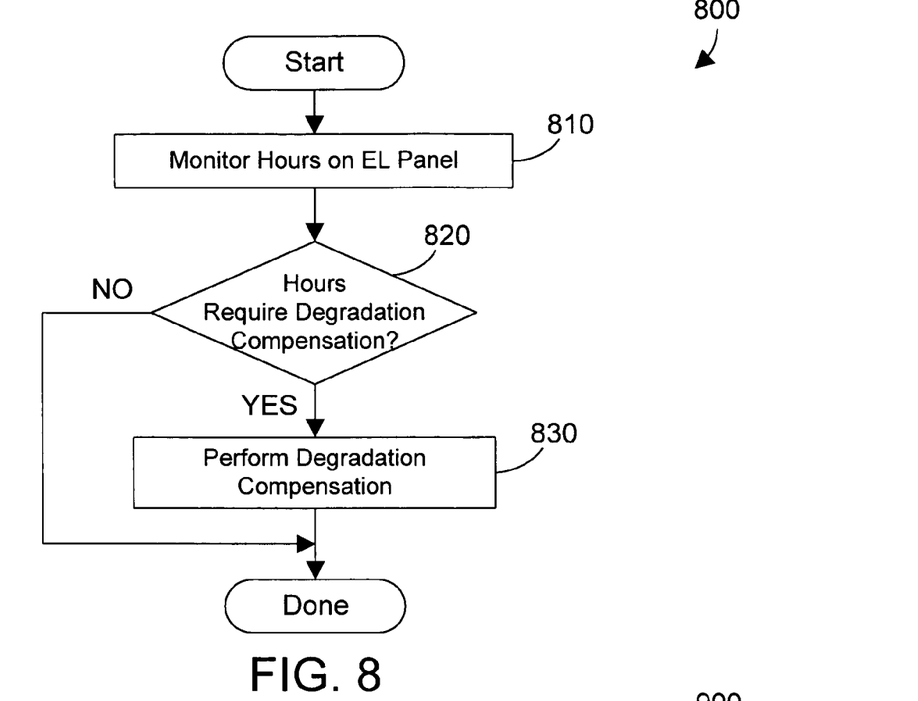
FIG. 8 is a flow diagram of a method for automatically compensating for EL panel degradation in accordance with the preferred embodiments.

Referring to FIG. 8, a method 800 represents steps performed by the degradation compensation 114 in FIG. 1. The hours on the EL panel are monitored (step 810). This can be done by the power supply storing the total time the EL panel is powered on. If the number of hours is high enough that degradation compensation is needed (step 820=YES), the outputs are varied to compensate for the degradation (step 830). If no degradation compensation is needed (step 820=NO), method 800 is done.

The degradation compensation 114 preferably uses a real-time clock to determine how long the sign is turned on. The presence of a real-time clock provides other potentially useful features for the programmable power supply, such as turn-on or turn-off at a specific time of day, turn-on for a specified time period, etc.

Note that degradation compensation may also be performed on a segment-by-segment basis. In this scenario, each segment in the EL panel is individually monitored by summing the time periods during which the segment is illuminated. The degradation compensation for each segment will depend upon the sum of the times the particular segment has been illuminated. Thus, if each segment is on a different amount of time during each cycle, the degradation compensation for each channel may be customized accordingly. A method that produces the same result at less overhead for the controller monitors the overall time the sign is on, and determines from the program how much of the total time each segment has been turned on.

As discussed above, determining whether the number of hours on an EL panel or segment require degradation compensation may be statistic-based or performance-based. In the case of statistic-based degradation compensation, an output channel is varied according to the expected degradation according to a stored curve or table. In the case of performance-based degradation compensation, the operating characteristics of the EL panel are dynamically monitored, and appropriate degradation compensation is then performed on each output channel as required to provide a consistent brightness over the life of the EL segment.

Figure 9:
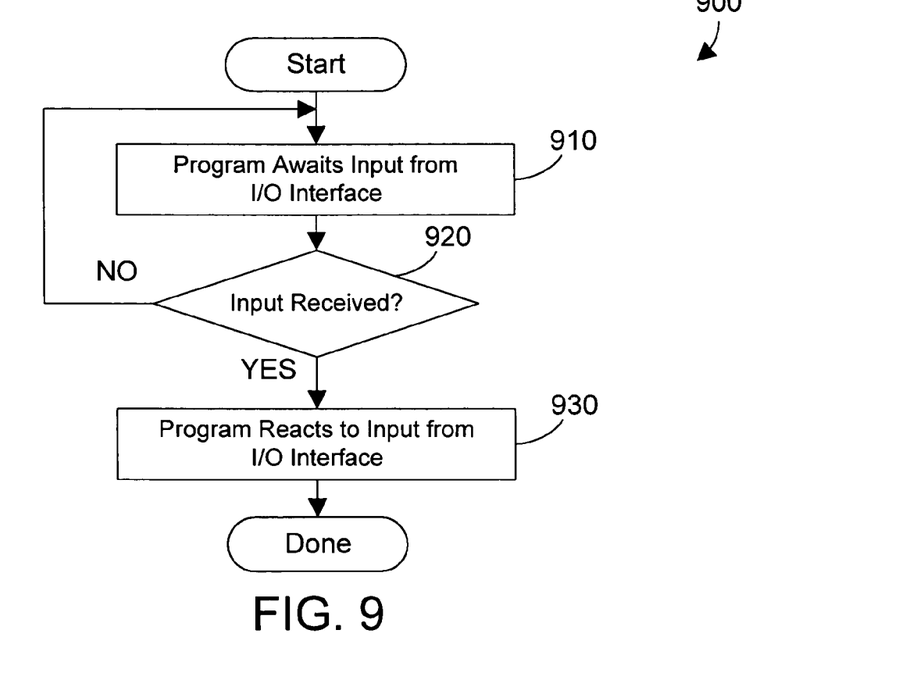
FIG. 9 is a flow diagram of a method for the controller of FIG. 1 to respond to inputs on the I/O interface.

Another advantage of the power supply of the preferred embodiments is the ability to receive input signals and to provide output signals via the I/O interface 122 shown in FIG. 1. Referring to FIG. 9, a method 900 in accordance with the preferred embodiments starts by the program awaiting input from the I/O interface (step 910). If no input is received (step 920=NO), method 900 loops back to step 910 until in input from the I/O interface is received (step 920=YES). The program then reacts to the input from the I/O interface (step 930).

A simple example will illustrate the concepts in method 900 in FIG. 9. Let's assume that a hallway of a building is lined with five signs on each of the opposing walls of the highway, directly across from each other. Let's further assume that the signs advertise American flags by a national distributor. A motion sensor could be wired to the I/O interface 122, and the controller 110 could be programmed to go into an idle mode where no output channels are driven when no motion is detected for some predetermined period of time, say two minutes. When a motion sensor detects motion, the controller could then execute its program, which might, for example, light up the first two signs on opposite walls nearest the person that set off the motion detector, followed by a sequenced lighting of the other four sets of signs. The controller 110 could also provide an output on its I/O interface 122 that provides audio information to speakers, so a patriotic song could be played along with an audio sales pitch for the flags. In the alternative, a control output could be provided which could be used by external equipment to play the desired song and sales pitch. The I/O interface and programmability of the power supply of the preferred embodiments allow great flexibility in controlling signs in ways that allow customizing the signs according to a particular application. As the above example also shows, a single power supply could be used to drive different signs with the different output channels.

While FIG. 9 and the simple example above assume the controller waits for some I/O event before performing a corresponding function, the preferred embodiments also extend to processing I/O events during normal program execution. Thus, the controller may be actively controlling one or more signs, and an I/O event could signal the controller to do something different or additional for some specified time period. Thus, I/O sensors could be used to alter the function of a controller that is already executing a program, rather than just initiating the execution of a program.

Figure 10:
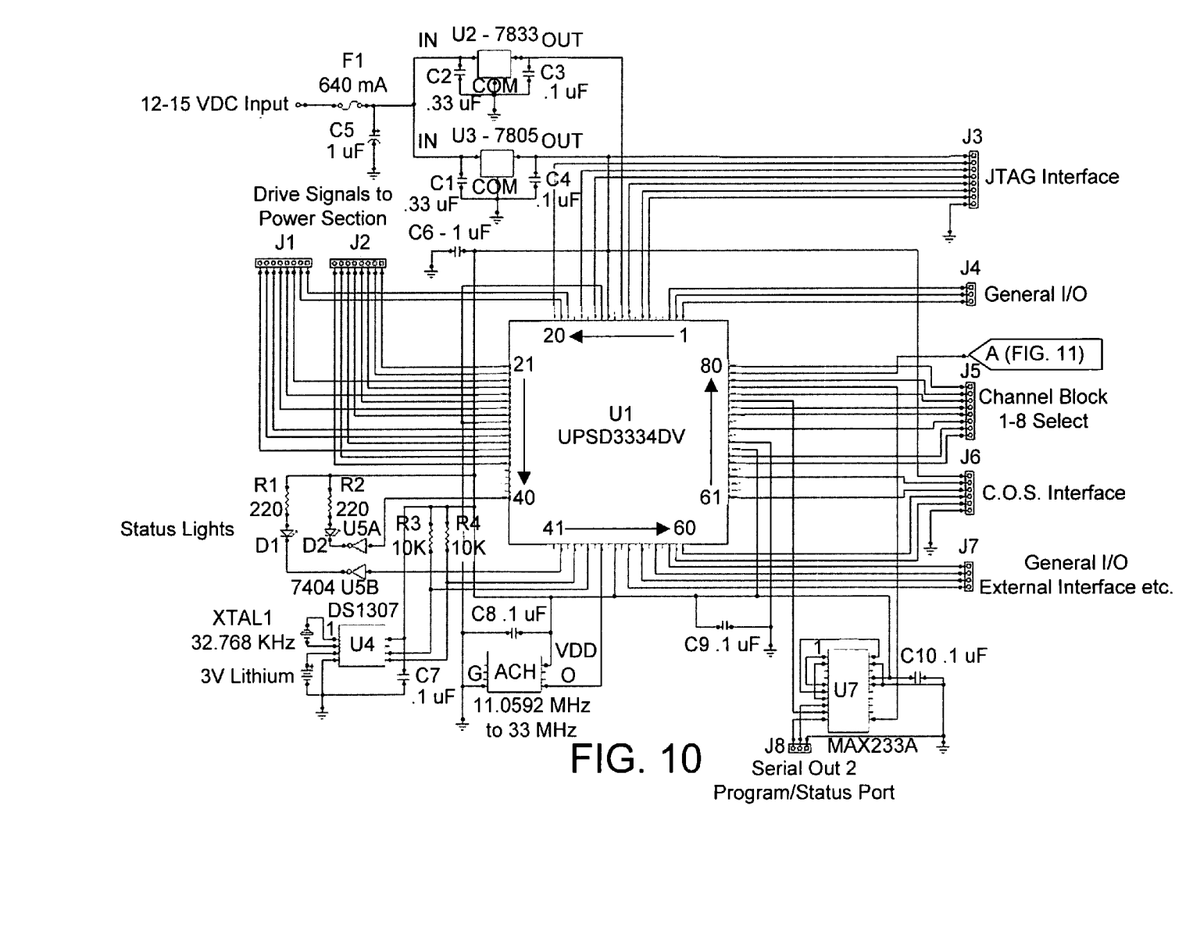
FIG. 10 is a detailed schematic of a first portion of one specific implementation of the programmable power supply within the scope of the preferred embodiments.
Figure 11:
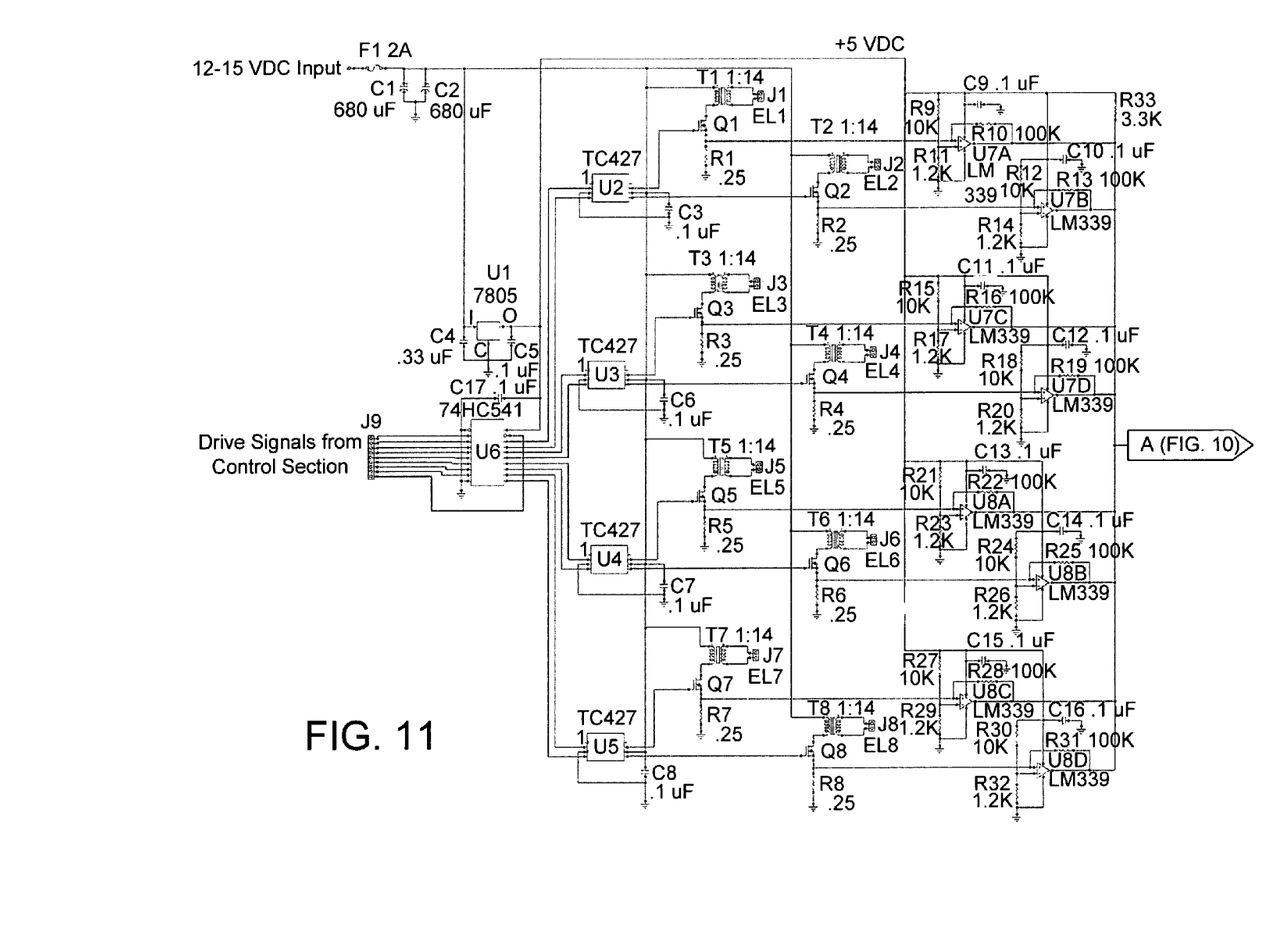
FIG. 11 is a detailed schematic of a second portion of one specific implementation of the programmable power supply within the scope of the preferred embodiments.

The schematic diagram in FIGS. 10 and 11 show the best mode of the invention. FIG. 10 shows the control section, while FIG. 11 shows the power section that includes the individual output channels. In the control section in FIG. 10, the UPSD3334DV microcontroller provides the intelligence for controlling the power supply. The microcontroller drives sixteen outputs as drive signals to the power section. Eight of these are connected to the power section, as shown in FIG. 11, while the remaining eight are optional (e.g., held in reserve). These eight drive signals from the control section drive each of the eight output channels. Each output channel includes a transformer that has a primary side that is driven by one of the drive signals, thereby providing direct control of frequency and duty cycle of each output channel. The output of the transformer directly drives a display segment on a sign. Each output channel also includes an overload detection circuit that signals via signal A in FIG. 11 that an overload condition has occurred by driving signal A low. In response, the controller will stop driving the eight drive signals to the power section, which will ideally shut down the power section before damage can result to the components in the power section caused by an overload.

The most preferred specifications for a suitable transformer (320 in FIG. 3 and T1-T8 in FIG. 11) are:
powdered iron core
turns ratio: 1:10
DC resistance primary: 1.96 ohms max
DC resistance secondary: 197 ohms max
test input on primary: 1 VAC @ 1 KHz, 0 ADC
inductance of secondary: 5.4 mH+/−8%
HIPOT test: 1500 VAC, 60 Hz, primary to secondary, windings to core The preferred embodiments provide a very powerful and flexible power supply for multiple output circuits. A program for the power supply may be downloaded from the device to be powered, or may be downloaded from a suitable external program source. A connection system allows conductors on the edge of an EL panel to mate with a card-edge-type connector on the power supply to eliminate wire pigtails on the back of the EL panel. Automatic degradation compensation may be performed to keep an EL panel illuminated to the same level of brightness even though it has a tendency to dim over time. The programmable power supply is completely reusable because the power supply may be reprogrammed by either plugging a different sign with a program into the output connector, or by downloading a new program from an external program source.

Variations of the specific examples disclosed herein are within the scope of the preferred embodiments. For example, the animation of a sign using an EL panel that is separated into distinct segments is only one way of animating a sign within the scope of the preferred embodiments. In addition, the preferred embodiments expressly extend to any sign that has multiple segments that may be illuminated, including an array of display elements that form an X-Y pixel array that could provide limitless things that could be displayed on a single sign depending on the program in the power supply that drives the pixel array.

One skilled in the art will appreciate that many variations are possible within the scope of the present invention. Thus, while the invention has been particularly shown and described with reference to preferred embodiments thereof, it will be understood by those skilled in the art that these and other changes in form and details may be made therein without departing from the spirit and scope of the invention.

What is claimed is:

1. A combination power supply and sign,
(A) the sign comprising:
a plurality of display segments electrically coupled to conductive pads at an edge region of the sign; and
a program that specifies a desired sequence for driving the plurality of display segments;
(B) the power supply comprising:
an output connector that receives the edge region of the sign and makes electrical contact with the conductive pads;
a plurality of output channels coupled to the output connector for driving the plurality of display segments on the sign; and
a controller that drives the plurality of output channels according to the program that is downloaded from the sign, wherein the controller comprises a compensation mechanism that compensates for degradation of the plurality of display segments by altering over time the power supplied by the plurality of output channels.

2. The combination power supply and sign of claim 1 wherein each of the plurality of output channels may be individually driven by the controller with a frequency and a duty cycle.

3. A combination power supply and sign,
(A) the sign comprising:
a plurality of display segments electrically coupled to conductive pads at an edge region of the sign; and
a program that specifies a desired sequence for driving the plurality of display segments;
(B) the power supply comprising:
an output connector that receives the edge region of the sign and makes electrical contact with the conductive pads;
a plurality of output channels coupled to the output connector for driving the plurality of display segments on the sign; and
a controller that drives the plurality of output channels according to the program that is downloaded from the sign, wherein the controller comprises a programming interface for downloading a second program from an external program source.

4. A combination power supply and sign,
(A) the sign comprising:
a plurality of display segments electrically coupled to conductive pads at an edge region of the sign; and
a program that specifies a desired sequence for driving the plurality of display segments;
(B) the power supply comprising:
an output connector that receives the edge region of the sign and makes electrical contact with the conductive pads;
a plurality of output channels coupled to the output connector for driving the plurality of display segments on the sign; and
a controller that drives the plurality of output channels according to the program that is downloaded from the sign, wherein the controller comprises an I/O interface that allows the controller to drive the plurality of output channels based on at least one input from the I/O interface, and that outputs at least one output signal to the I/O interface.

5. The combination power supply and sign of claim 1 wherein the program defines at least one on time and at least one off time for at least one of the plurality of output channels.

6. The combination power supply and sign of claim 5 wherein the program provides a sequence for the plurality of output channels that provides animation for the plurality of display segments.

7. The combination power supply and sign of claim 1 wherein each of the plurality of output channels comprises a transformer having a primary winding and a secondary winding, wherein the controller controls application of power to the primary winding and the secondary winding is coupled to the sign through the output connector.

8. The combination power supply and sign of claim 1 wherein each of the plurality of output channels comprises an overload detection circuit that detects an overload condition in the channel, and in response thereto, provides an indication of the overload condition to the controller.

9. The combination power supply and sign of claim 1 wherein the controller further comprises an expansion connector that allows coupling a plurality of slave controllers to the expansion connector, each slave controller controlling a different plurality of output channels.

10. A method for driving a multi-circuit sign, the method comprising the steps of:
   connecting the multi-circuit sign to a power supply;
   the power supply downloading from the sign a program for driving a plurality of circuits on the sign;
   the power supply driving a plurality of output channels coupled to the plurality of circuits on the sign according to the program downloaded from the sign; and
   compensating for degradation of the sign by altering over time the power supplied by the plurality of output channels.

11. The method of claim 10 further comprising the step of individually driving each of the plurality of output channels with a frequency and a duty cycle.

12. A method for driving a multi-circuit sign, the method comprising the steps of:
   connecting the multi-circuit sign to a power supply;
   the power supply downloading from the sign a program for driving a plurality of circuits on the sign;
   the power supply driving a plurality of output channels coupled to the plurality of circuits on the sign according to the program downloaded from the sign; and
   downloading a second program from an external program source.

13. A method for driving a multi-circuit sign, the method comprising the steps of:
   connecting the multi-circuit sign to a power supply;
   the power supply downloading from the sign a program for driving a plurality of circuits on the sign;
   the power supply driving a plurality of output channels coupled to the plurality of circuits on the sign according to the program downloaded from the sign;
   receiving at least one input signal from an I/O interface;
   driving the plurality of output channels based on the at least one input from the I/O interface; and
   outputting at least one output signal to the I/O interface.

14. The method of claim 10 wherein the program defines at least one on time and at least one off time for at least one of the plurality of output channels.

15. The method of claim 14 wherein the program provides a sequence for the plurality of output channels that provides animation for the multi-circuit sign.

16. The method of claim 10 wherein each of the plurality of output channels comprises a transformer having a primary winding and a secondary winding, wherein the method further comprises the step of controlling application of power to the primary winding with the secondary winding coupled to the multi-circuit sign.

17. The method of claim 10 further comprising the step of connecting at least one slave controller to the power supply, each slave controller controlling a different plurality of output channels.

18. A combination power supply and sign,
   (A) the sign comprising:
      a plurality of display segments electrically coupled to a plurality of electrical contacts;
      a program that specifies a desired sequence for driving the plurality of display segments;
   (B) the power supply comprising:
      an output connector coupled to the plurality of electrical contacts on the sign;
      a plurality of output channels coupled to the output connector; and
      a controller that drives the plurality of output channels according to the program downloaded from the sign, wherein the controller comprises a compensation mechanism that compensates for degradation of the plurality of display segments by altering over time the power supplied by the plurality of output channels.

19. The combination power supply and sign of claim 18 wherein the program is downloaded from the sign by the controller when the output connector is coupled to the plurality of electrical contacts on the sign.

20. A combination power supply and sign,
   (A) the sign comprising:
      a plurality of display segments electrically coupled to a plurality of electrical contacts;
      a program that specifies a desired sequence for driving the plurality of display segments;
   (B) the power supply comprising:
      an output connector coupled to the plurality of electrical contacts on the sign;
      a plurality of output channels coupled to the output connector; and
      a controller that drives the plurality of output channels according to the program downloaded from the sign, wherein the program is downloaded from the sign by the controller via a wireless interface in the power supply.

21. The combination power supply and sign of claim 18 wherein each of the plurality of output channels may be individually driven by the controller with a frequency and a duty cycle.

22. A combination power supply and sign,
   (A) the sign comprising:
      a plurality of display segments electrically coupled to a plurality of electrical contacts;
      a program that specifies a desired sequence for driving the plurality of display segments;
   (B) the power supply comprising:
      an output connector coupled to the plurality of electrical contacts on the sign;
      a plurality of output channels coupled to the output connector; and
      a controller that drives the plurality of output channels according to the program downloaded from the sign, wherein the controller comprises a programming interface for downloading a second program from an external program source.

23. A combination power supply and sign,
   (A) the sign comprising:
      a plurality of display segments electrically coupled to a plurality of electrical contacts;
      a program that specifies a desired sequence for driving the plurality of display segments;
   (B) the power supply comprising:
      an output connector coupled to the plurality of electrical contacts on the sign;

a plurality of output channels coupled to the output connector; and a controller that drives the plurality of output channels according to the program downloaded from the sign, wherein the controller comprises an I/O interface that allows the controller to drive the plurality of output channels based on at least one input from the I/O interface, and that outputs at least one output signal to the I/O interface.

24. The combination power supply and sign of claim 18 wherein the program defines at least one on time and at least one off time for at least one of the plurality of output channels.

25. The combination power supply and sign of claim 24 wherein the program provides a sequence for the plurality of output channels that provides animation for the plurality of display segments.

26. The combination power supply and sign of claim 18 wherein each of the plurality of output channels comprises a transformer having a primary winding and a secondary winding, wherein the controller controls application of power to the primary winding and the secondary winding is coupled to the sign through the output connector.

27. The combination power supply and sign of claim 13 wherein each of the plurality of output channels comprises an overload detection circuit that detects an overload condition in the channel, and in response thereto, provides an indication of the overload condition to the controller.

28. The combination power supply and sign of claim 13 wherein the controller further comprises an expansion connector that allows coupling a plurality of slave controllers to the expansion connector, each slave controller controlling a different plurality of output channels.

29. A combination power supply and sign,
(A) the sign comprising:
a plurality of display segments electrically coupled to conductive pads at an edge region of the sign; and
a program that specifies a desired sequence for driving the plurality of display segments;
(B) the power supply comprising:
an output connector that receives the edge region of the sign and makes electrical contact with the conductive pads;
a plurality of output channels coupled to the output connector for driving the plurality of display segments on the sign; and
a controller that drives the plurality of output channels according to the program that is downloaded from the sign wherein the program is downloaded from the sign by the controller via a wireless interface in the power supply.

30. A method for driving a multi-circuit sign, the method comprising the steps of:
connecting the multi-circuit sign to a power supply;
the power supply downloading from the sign via wireless interface a program for driving a plurality of circuits on the sign; and
the power supply driving a plurality of output channels coupled to the plurality of circuits on the sign according to the program downloaded from the sign.

* * * * *